US011953143B1

(12) United States Patent
Carpenter et al.

(10) Patent No.: US 11,953,143 B1
(45) Date of Patent: *Apr. 9, 2024

(54) MOUNTING PAD AND METHOD FOR DETERRING THEFT AND SECURING OUTDOOR EQUIPMENT AND APPLIANCES AGAINST HIGH WINDS

(71) Applicant: Mainstream Engineering Corporation, Rockledge, FL (US)

(72) Inventors: Andrew L Carpenter, Rockledge, FL (US); Robert P Scaringe, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,489

(22) Filed: Aug. 23, 2022

Related U.S. Application Data

(63) Continuation of application No. 17/518,682, filed on Nov. 4, 2021, now Pat. No. 11,460,149.

(51) Int. Cl.
*F24F 13/32* (2006.01)
*F16M 11/22* (2006.01)

(52) U.S. Cl.
CPC ......... *F16M 11/22* (2013.01); *F16M 2200/08* (2013.01)

(58) Field of Classification Search
CPC ... Y10S 248/91; F16M 11/22; F16M 2200/08
USPC ....... 248/545, 678, 679, 156, 346.01, 346.2, 248/346.03, 346.06, 346.5, 499, 507, 508; 220/475, 630, 636, 601; 108/55.5
See application file for complete search history.

(56) References Cited

U.S. PATENT DOCUMENTS

| | | | |
|---|---|---|---|
| 3,493,201 A | 2/1970 | Marran | |
| 3,713,620 A | 1/1973 | Tkach | |
| 3,722,845 A * | 3/1973 | Unger | F24F 1/0003 248/346.03 |

(Continued)

OTHER PUBLICATIONS

Design for Manufacturability Handbook, 2nd ed., Bralla, James G., Editor, Chapter 6.4 Rotationally Molded Plastic Parts, authored by Mohr, Gilbert J., p. 6.63, McGraw-Hill © 1999.

*Primary Examiner* — Christopher Garft
*Assistant Examiner* — Michael McDuffie
(74) *Attorney, Agent, or Firm* — Michael W. O'Neill, Esq.

(57) ABSTRACT

A mounting pad system for securing equipment, such as an HVAC outdoor unit or a standby generator, is provided in the form of a lightweight fillable pad member having a plurality of receivers located on a top surface of the pad member. The receivers are associated with attachment points located on the equipment and are used to secure the equipment to the pad. The pad member contains a filling port on its top surface and is configured as a molded hollow shell containing a gelling material which, when mixed with water, provides support to reduce deflection of the pad member caused by the equipment secured to the pad, prevents damage to the pad that would otherwise be caused by the expansion of internal contents upon freezing and prevents leakage of internal contents of the fillable pad in the event of an unintended breach in the hollow shell. The pad member is provided with at least one through-hole that acts as a supporting structure.

16 Claims, 16 Drawing Sheets

(56) References Cited

U.S. PATENT DOCUMENTS

| | | | |
|---|---|---|---|
| 3,841,032 | A | 10/1974 | Grannis, III |
| 4,212,446 | A | 7/1980 | Domanick et al. |
| 4,829,909 | A | 5/1989 | Mandel |
| 4,951,433 | A * | 8/1990 | Miller ............... E04H 12/20 52/126.6 |
| 6,155,527 | A | 12/2000 | Muyskens |
| 6,651,454 | B1 | 11/2003 | Spiegel |
| 6,655,648 | B2 | 12/2003 | Harris |
| 6,840,487 | B2 | 1/2005 | Carnevali |
| 7,185,871 | B2 | 3/2007 | Orozco |
| 7,334,421 | B1 | 2/2008 | Cantolino |
| 7,607,628 | B2 | 10/2009 | Elder |
| 7,780,140 | B1 * | 8/2010 | Ward ............... E02D 27/44 248/678 |
| 7,988,106 | B2 | 8/2011 | Carnevali |
| 8,074,952 | B2 | 12/2011 | Baechle |
| 8,640,632 | B1 | 2/2014 | Odle |
| 8,959,882 | B2 | 2/2015 | Kleppe |
| 9,151,315 | B2 | 10/2015 | McPheeters |
| 10,408,493 | B1 | 9/2019 | Carpenter |
| 10,559,742 | B1 * | 2/2020 | Sting ............... F24F 1/60 |
| 11,460,148 | B1 * | 10/2022 | Carpenter ............... F24F 13/32 |
| 2002/0083660 | A1 | 7/2002 | Oliver |
| 2007/0029006 | A1 * | 2/2007 | Lampropoulos ....... A61B 50/33 141/311 A |
| 2007/0241255 | A1 | 10/2007 | Dvoracek |
| 2009/0291242 | A1 | 11/2009 | Owens, III |
| 2010/0320360 | A1 | 12/2010 | McLead |
| 2011/0061572 | A1 | 3/2011 | Liu |
| 2012/0106087 | A1 | 5/2012 | Feller |

\* cited by examiner

MOUNTING PAD AND METHOD FOR DETERRING THEFT AND SECURING OUTDOOR EQUIPMENT AND APPLIANCES AGAINST HIGH WINDS

CROSS-REFERENCE TO RELATED APPLICATIONS

This application is a continuation of U.S. patent application Ser. No. 17/518,682, filed on Nov. 4, 2021, that is now pending, which is a continuation of U.S. patent application Ser. No. 16/667,967, filed Oct. 30, 2019, that is now U.S. Pat. No. 11,384,896, which is continuation of U.S. patent application Ser. No. 16/454,597, filed Jun. 27, 2019, that is now U.S. Pat. No. 10,557,589, and which is a continuation-in-part to U.S. patent application Ser. No. 15/875,359, filed Jan. 19, 2018, that is now U.S. Pat. No. 10,408,493, each of which is incorporated by reference herein in its entirety. This application is related to U.S. patent application Ser. No. 15/685,283 filed Aug. 24, 2017, that is now U.S. Pat. No. 10,559,742, in the name of Elliot M. Sting and Robert P. Scaringe and entitled "Mounting Pad And Method for Deterring Theft And Securing Air Conditioning Units Against High Winds," which has been patented and the subject matter of which is incorporated herein by reference. This application is related to co-pending U.S. Patent Application No. TBD, filed concurrently, entitled "Improved Mount Pad and Method for Deterring Theft and Securing Outdoor Equipment and Appliances Against High Winds".

BACKGROUND AND SUMMARY OF THE INVENTION

The present invention relates to a support pad for outdoor equipment and appliances and installation method that not only raises the unit, equipment, or appliance to provide clearance from grade, as required by most building codes, but that also secures that unit, equipment, or appliance to prevent movement and tipping associated with hurricane force winds.

Typically, an equipment pad, like those used for AC condensing units and generators that provide temporary power solutions, is constructed of poured concrete formed in situ. This may be convenient when other concrete work is being performed on site, however, a typical or average installer would find mixing or purchasing concrete specifically for this small application to be impractical, time consuming, or expensive. A poured concrete pad also takes time to cure before heavy equipment can be placed on and fastened to it, further interrupting the installation process.

Prefabricated plastic and concrete pads are available as an alternative for transport and placement on site. Available plastic pads are typically lightweight and do not provide the required dead load to resist tipping due to high winds once equipment is mounted on the pad. Conventional hardware used to secure equipment to these relatively thin plastic pads may also be prone to pulling out of the plastic. Conversely, preformed solid concrete pads are heavy and difficult to handle. Other available pads are composed of a lightweight foam interior contained within a concrete shell, such as the "The Hurricane Pad™" manufactured by DiversiTech (Duluth, GA). As a result of their construction, these foam interior pads are prone to damage if dropped or mishandled. In many instances, foam-cored pads are too light to adequately secure an air conditioner in high winds.

A hurricane-wind rated equipment pad must be able to keep the equipment in place during high winds and also prevent the unit from toppling over or moving. The minimum necessary weight of the pad is dependent on the size and weight of the equipment and the wind speed. Hurricane-resistant equipment pads must survive wind speeds up to 180 mph, with the actual required wind speed dependent on the location.

As a demonstration, Table 1 below provides the minimum weight necessary for a 36 inch×36 inch pad to secure equipment of various sizes and weights. The wind load is calculated from the methods presented in American Society of Civil Engineers (ASCE) Standard 7-16. The equipment and pad are assumed to be a rigid structure resting on flat ground in a moderately open area. The dimensions and weights of the equipment listed in Table 1 are based on commercially available outdoor units used in split air conditioning (AC) systems and are representative of equipment that could be mounted to such pads. Modern, high-efficiency, AC outdoor units have become much taller to allow greater heat exchanger area on the same footprint, which has exacerbated the wind-driven tipping issue. For example, in Table 1 the Required Pad Weight increases from 148 pounds for a 24×24×30-inch-high outdoor unit to 519 pounds for a 32×32×50-inch-high outdoor unit atop a 4 inch tall pad in a 150 mph wind zone. Building codes also require a minimum of a 2 inch border around the perimeter of any equipment, so that a 32 inch base is the largest unit size that can be placed on a 36 inch pad.

TABLE 1

Required equipment pad weight to resist tipping.

| Unit Dimensions | | | | Required Pad Weight | |
| --- | --- | --- | --- | --- | --- |
| Width (in) | Length (in) | Height (in) | Weight (lb) | 150 mph Wind (lb) | 180 mph Wind (lb) |
| 24 | 24 | 30 | 100 | 148 | 257 |
| 24 | 24 | 35 | 120 | 206 | 349 |
| 26 | 26 | 30 | 120 | 149 | 266 |
| 26 | 26 | 35 | 140 | 213 | 368 |
| 28 | 28 | 30 | 140 | 149 | 276 |
| 28 | 28 | 35 | 160 | 219 | 386 |
| 28 | 28 | 40 | 190 | 292 | 505 |
| 30 | 30 | 30 | 160 | 149 | 285 |
| 30 | 30 | 35 | 190 | 216 | 395 |
| 30 | 30 | 40 | 220 | 297 | 524 |
| 30 | 30 | 45 | 240 | 400 | 682 |
| 32 | 32 | 35 | 220 | 213 | 403 |
| 32 | 32 | 40 | 250 | 301 | 543 |
| 32 | 32 | 45 | 280 | 403 | 703 |
| 32 | 32 | 50 | 310 | 519 | 883 |

Table 1 makes clear that a concrete pad would need to be quite heavy to prevent tipping due to the moment caused by wind, making it very difficult to carry one into place at the installation site.

One known approach proposed the use of a hollow pad with a hollow interior chamber filled with sand, other granular materials, or water so as to achieve the necessary weight required to prevent the pad from tipping in hurricane-strength winds. With water, the pad was not intended to be completely filled so that in colder climates, the expansion of water as it freezes would not deform or damage the pad. Even if such a pad were completely filled with water and the height was increased to 6 inches, for certain tall outdoor equipment, the water alone would not provide sufficient weight to keep the pad in place in the highest possible wind zones, such as the 180 mph region of south Florida. The weight of the pad can be further increased with use of higher density fill materials such as sand, which is known in the art.

At least one central support has also been proposed to prevent sagging, but that would limit the ability of a granular material, like sand, to completely fill the hollow core, reducing the fill volume and therefore the weight of the filled pad. If the central support is large, it can significantly reduce the volume of fill material available for weighing the pad down.

One object of our invention is to provide an easily-transportable, lightweight, rugged, and low-cost equipment mounting pad and installation method that, once located and leveled on site, can be secured to prevent theft and tipping, even in high wind loads. Our novel equipment pad can be configured as a hollow plastic shell that can be rotationally molded to reduce cost and minimize weight. If the pad is formed by conventional rotational molding, the molded pad will typically be formed from one of a variety of thermo-formed plastics. The currently preferred embodiment uses a linear low-density polyethylene (LLDPE) to form a rigid structure with uniform wall thickness. However, any thermoform-capable material such as low-density polyethylene (LDPE), medium density polyethylene (MDPE), high density polyethylene (HDPE), cross linked polyethylene (XLPE), nylon, polypropylene, and polyvinyl chloride (PVC) are acceptable alternatives. While the currently preferred material wall thickness for the pad is 0.2 inches throughout the pad, alternative embodiments can use material thicknesses from 0.1 inches to 0.75 inches with, if desired to reduce costs, non-uniform wall thickness by using well known shielding on the rotational mold to adjust cooling times and thereby obtain non-uniform wall thicknesses. For example, the side-walls could be 0.1 inches, the top load bearing surface 0.5 inches, and the bottom ground facing surface 0.2 inches. As pointed out herein, the adjustable securing slots in the pad provide support from deflection and can allow the load bearing surfaces to be thinner as well.

The empty shell, which contains a gelling formulation of known composition according to our invention, can be filled with water and sealed once at the installation site. The gel/solidus formed inside the pad will be used to prevent weight loss, even if the leak-tight seal is compromised. Additionally, if a super absorbent polymer (SAP), including but not limited to sodium polyacrylate, sodium polycarbonate, polyacrylamide copolymers, ethylene maleic anhydride, carboxymethylcellulose, polyvinyl alcohol copolymers, or polyethylene oxide, is used in the gelling compound formulation, then the resulting mixture will not expand upon freezing, thereby allowing the pad to be completely filled with water, avoiding the need for an expansion void space. Filling the interior volume completely also allows the gelled mixture to provide support to the pad, serving to prevent deformation and remove the need for any dedicated internal support structure.

In the event the filled equipment pad, according to our invention, did to provide sufficient weight to prevent tipping in the highest wind conditions, anchors can be screwed into the ground to add additional tipping resistance.

Our novel equipment mounting pad will be secured, in one way, to the outdoor unit through easily adjustable securing straps that are installed into specially designed slots through the top of the pad. The securing straps are adjustable within the slots, able to rotate and slide inwards and outwards, to accommodate various sizes and shapes of equipment. These straps are cinched down to the pad and fastened to the unit to firmly secure the unit to the pad, preventing rocking, excessive vibration, and tipping. Additionally, extra slots and slots at various slot angles can be made available for use without departing from the scope of our invention. These slots also provide structural strength to the pad.

Our novel equipment mounting pad will be secured, in another way, to the outdoor unit, equipment, or appliance through the inclusion of receivers that are installed in the mounting pad. Fasteners are then passed through mounting points on the outdoor unit and fasten into the inserts that are installed in the mounting pad.

The equipment pad of our invention also contains a structure for anchoring the pad to the underlying support, whether soil, concrete, or other. Mount holes positioned near the perimeter of pad allow for the use of ground anchors or concrete fasteners and are positioned such that they can be installed with the unit in place. As stated earlier, anchoring the pad provides additional wind resistance, when needed, by holding the pad to the ground further preventing tipping or sliding of the unit and pad assembly.

The equipment pad of our invention contains a means for stacking multiple pads on top of one another and keeping them from sliding or shifting during storage and transportation. A protrusion on each corner or the sides of the equipment pad mates with a corresponding recess in the bottom of a pad placed on top of the former.

Equipment theft will be deterred due to the combined weight of the pad and the equipment, and if used, the lifting strength of the anchors installed into the underlying support. Moreover, our invention contemplates that the equipment can be connected to the pad with known types of anti-theft fasteners, such as one-way machine or sheet metal screws or those with unique heads that can only be removed with special tools. An anti-theft cable can also be installed. Similar to the securing straps, the anti-theft cable can connect to the pad using one of the unused slots.

BRIEF DESCRIPTION OF THE DRAWINGS

These and further features, objects, and advantages of the present invention will become more readily apparent from the following detailed description when taken in conjunction with the accompanying drawings wherein.

DETAILED DESCRIPTION OF THE DRAWINGS

Figure 1:
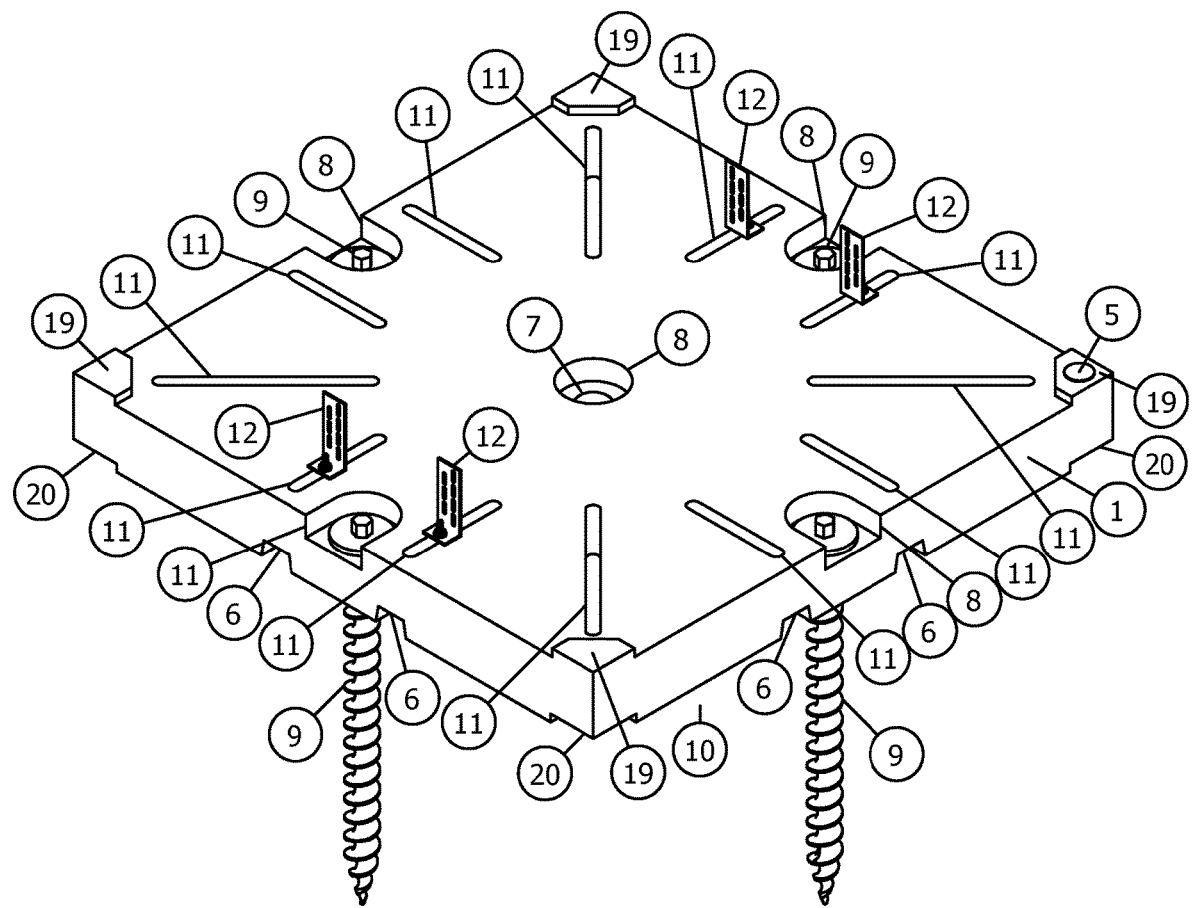
FIG. 1 is an isometric view of a currently preferred embodiment of the equipment support pad and securing system according to the present invention.

Referring now to FIG. 1, an equipment securing system 100, is shown where a hollow equipment pad 1 of approximately square or rectangular configuration (and which can have rounded corners rather than the illustrated right angle corners) has twelve securing slots 11 that can accommodate a desired number of securing strap assemblies 12. In a currently preferred embodiment, the strap assemblies 12 can be slid inwardly and outwardly, and can also be rotated tangentially to the equipment 2 (FIG. 2) and thereby conform to a wide variety of outdoor equipment types, sizes, and shapes. The slots may have a recess 6 (FIG. 5) to allow an associated retaining washer 13 of the securing strap assembly 12 (FIG. 6) to slide inwardly or outwardly without being restrained by the ground 10 the pad has been placed against. Protrusions 19 on the top side of the pad 1 and corresponding recesses 20 on the bottom of the pad 1 facilitate keeping pads in place when stacked for storage and transportation.

Figure 8:
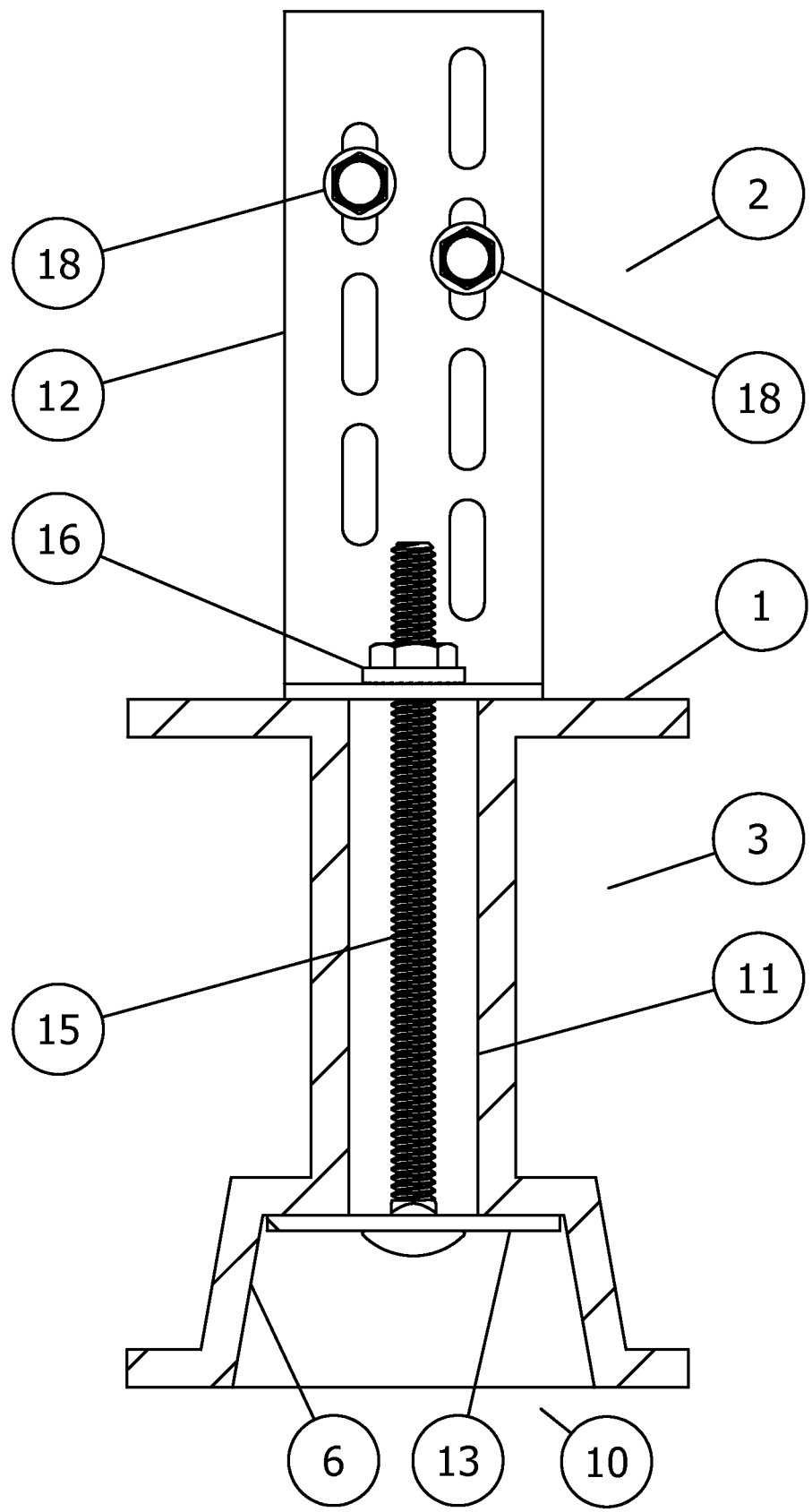
FIG. 8 is a side sectional view of the securing strap assembly installed into and cinched down to the equipment pad.

The currently preferred embodiment can also contain one or more optional securing anchors 9 (four are shown in FIG. 1) that are secured into the ground through by-pass holes 7 having recesses 8 at the pad's upper surface so that the anchors 9, one embodiment of which is shown in FIG. 8, can be screwed into the ground after the pad has been located and leveled. The adjustable strap slots 11 will also serve as central supporting structures eliminating the need for additional dedicated additional supporting structures which would increase cost and reduce fill volume. Once the pad 1 is filled completely with water (i.e., filled before the equipment 2 is located on the pad), the pad will also be supported by the interior fill volume, again eliminating the need for dedicated internal support structures. The filling port 5 for the pad 1 is located outside the footprint of the equipment 2 (FIG. 2) which in the currently preferred embodiment is located near a corner of the pad 1.

Figure 2:
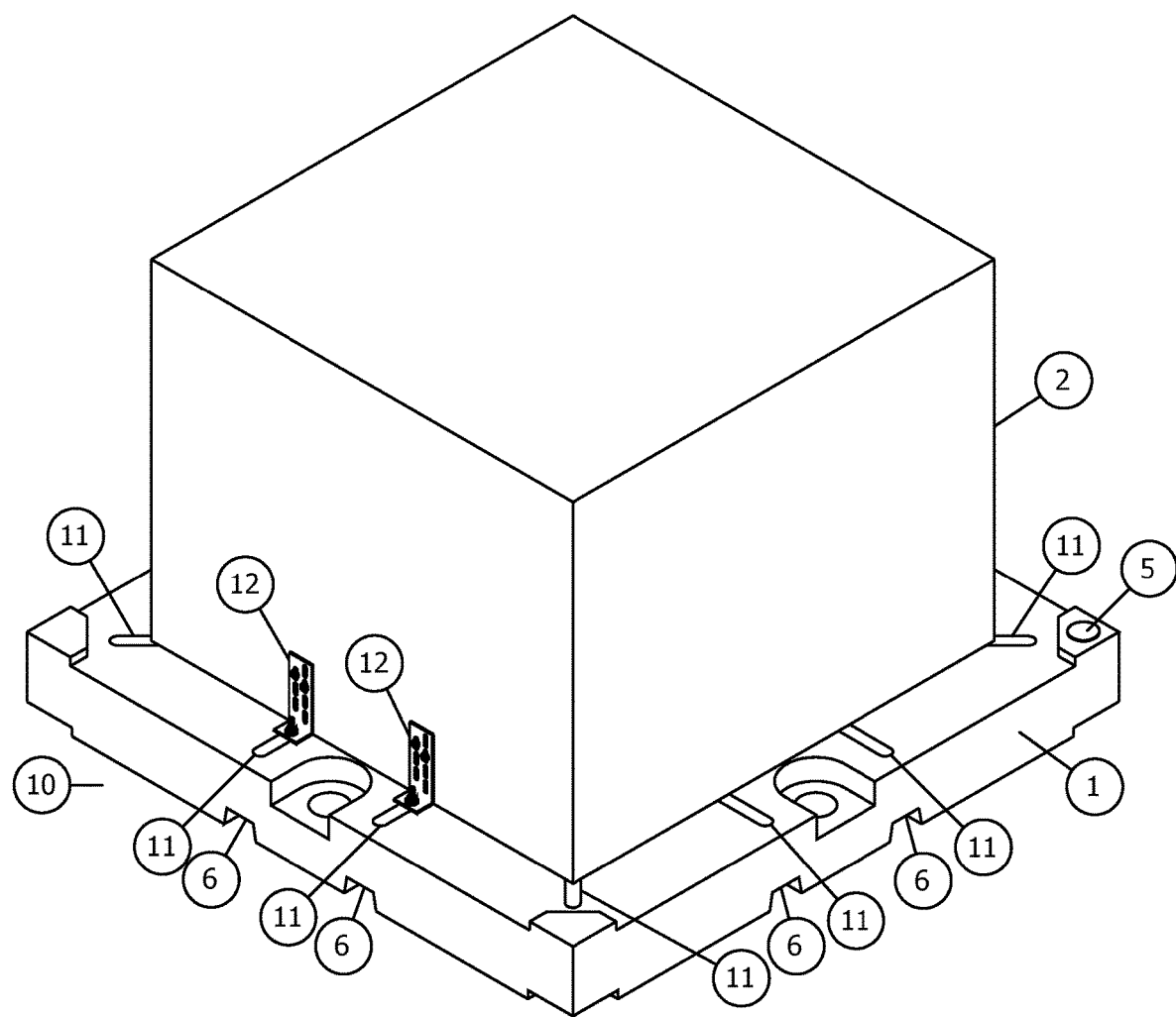
FIG. 2 is an isometric view of the equipment pad shown in FIG. 1, with a generalized equipment model secured to the pad.

FIG. 2. is an isometric view of the equipment pad 1 of FIG. 1, with equipment 2 secured to the top of the pad 1 using the securing strap assemblies 12. The equipment 2 is sized so that there is at least 2 inches of the pad 1 around the exterior that is not covered, as may be required by building codes. As shown, the anchors 9 and fill port 5 shown in FIG. 1 are completely exposed after the unit 2 has been installed. This is done to allow these items to be installed and accessible later after the equipment has been installed, if, say, a building inspector should decide anchors are necessary or an installer initially forgot to fill the pad or install the necessary anchors.

Figure 3:
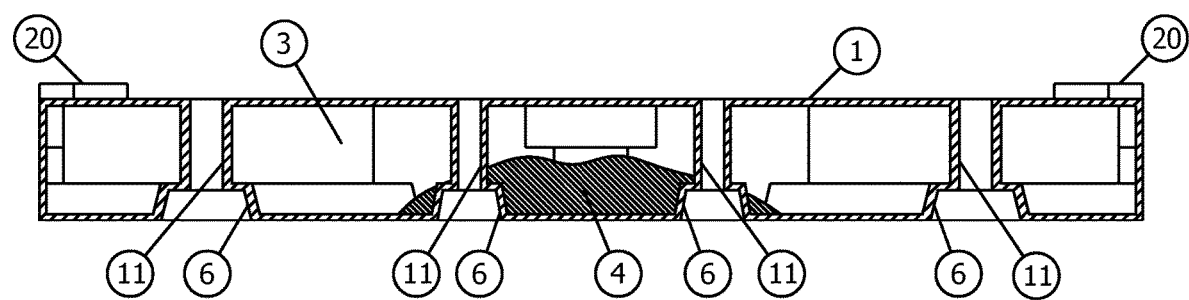
FIG. 3 is a side sectional view of the currently preferred embodiment of the equipment pad shown in FIG. 1.

FIG. 3 is a side sectional view of the equipment pad 1 and shows that the equipment pad has a hollow interior region 3 that will be filled with water and sealed when installed. The hollow region 3 will also contain a super absorbent polymer material 4 that will combine with the water and form a gel or solidus media filling the interior volume 3 to prevent leakage if the seal integrity is compromised. As noted already, additional dedicated support structures are not necessary to prevent sagging. It will be understood, of course, that the gelled completely filled interior volume and the slots 11 for the securing straps 12 both provide support to eliminate sagging.

Figure 4:
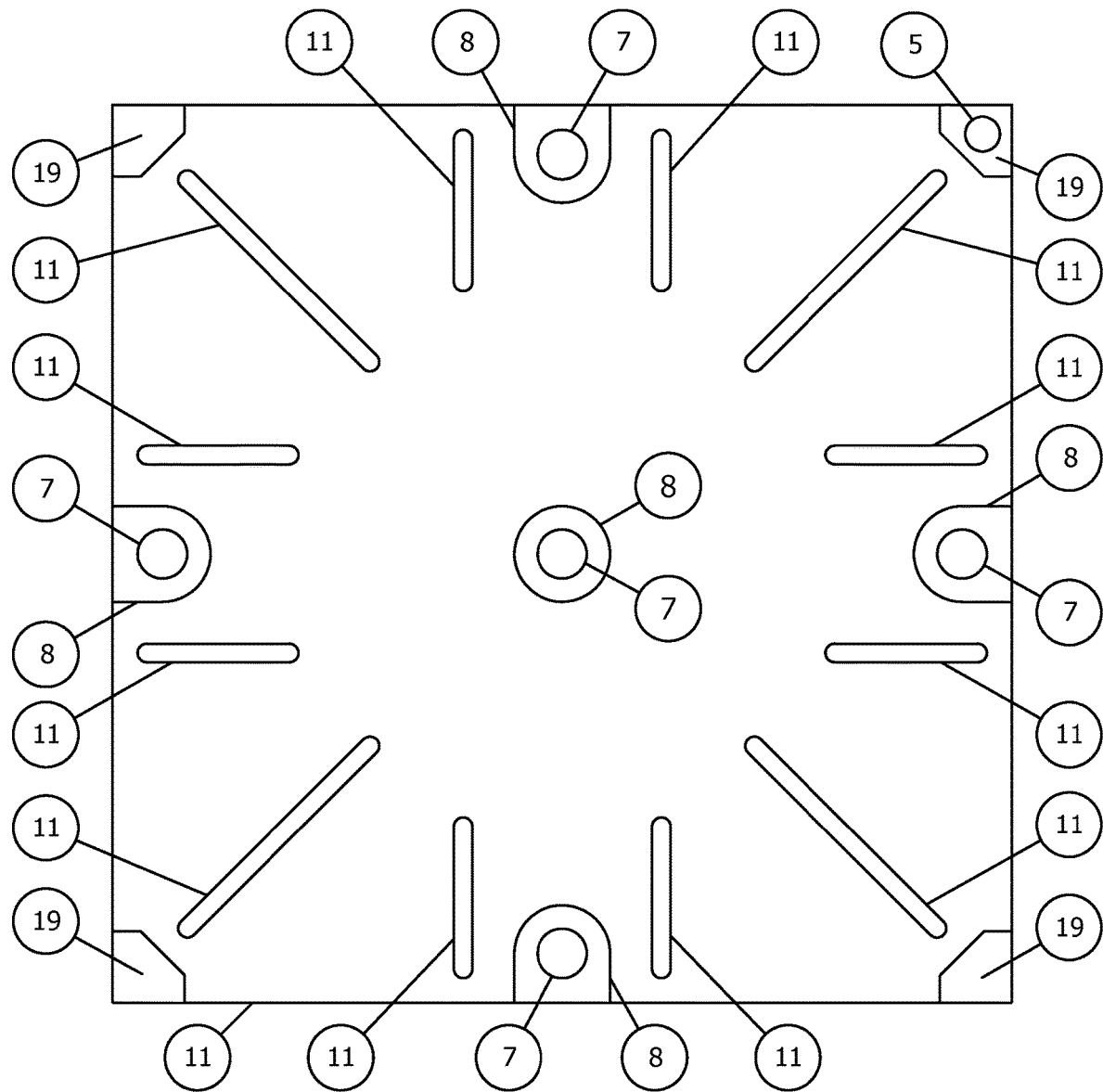
FIG. 4 is a top view of the equipment pad shown in FIG. 1.

FIG. 4 is a top view of the equipment pad 1 showing the holes 7 for the anchors 9, twelve slots 11 for the straps 12 that are used to secure the equipment 2 to the pad 1 and prevent any movement of the equipment on the pad. The holes 7 have a recess 8 so that the anchors 9, once installed, will be recessed into the surface of the pad allowing the equipment 2 to sit flat on the pad.

Figure 5:
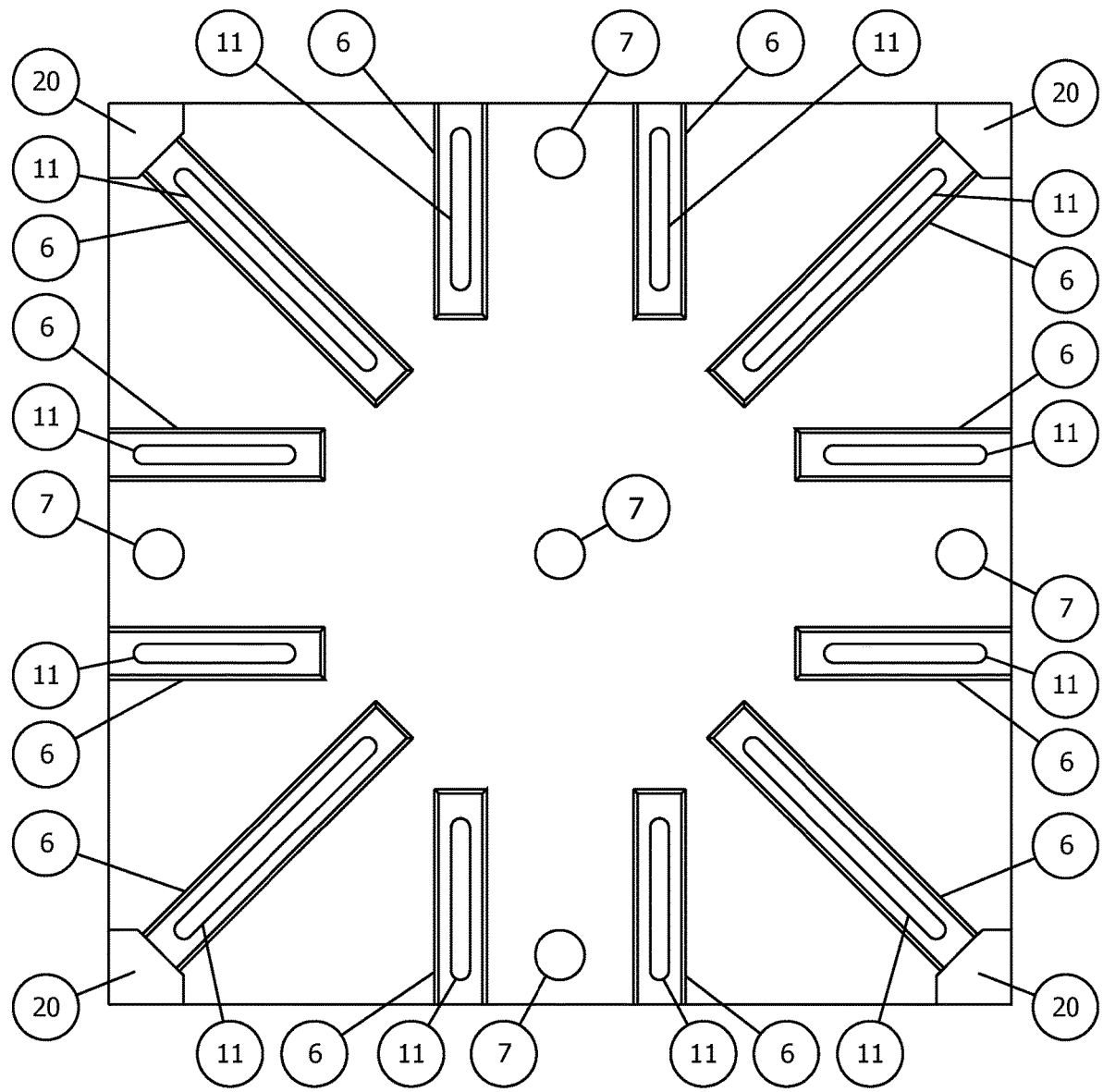
FIG. 5 is a bottom view of the equipment pad shown in FIG. 1.

FIG. 5 is a bottom view of the equipment pad 1. The recesses 6 surrounding the base of the slots 11 provide space for the retaining washers 13 of the securing strap assemblies 12 or optional anti-theft cables to be adjusted, that is slid along the length of the slot, without resistance from the ground 10 which could potentially impede motion. In addition, when the rectangular washer and carriage bolt assembly are dropped into the slot 11, the recess allows room for the rectangular washer to reorient itself so that it becomes parallel and form-locked to the base of the slot, preventing its removal as the carriage bolt 15 is tightened. The slot 11 also prevents the rectangular washer 13 and carriage bolt 15 from rotating, allowing the nut 16 of the securing strap assembly 12 to be tightened, thereby securely cinching it to the equipment pad 1. As already stated, these slots 11 also act as support structures to prevent deflection of the pad due to the weight of the equipment 2, such as an outdoor AC condensing unit, that is secured to the equipment pad 1.

Figure 6:
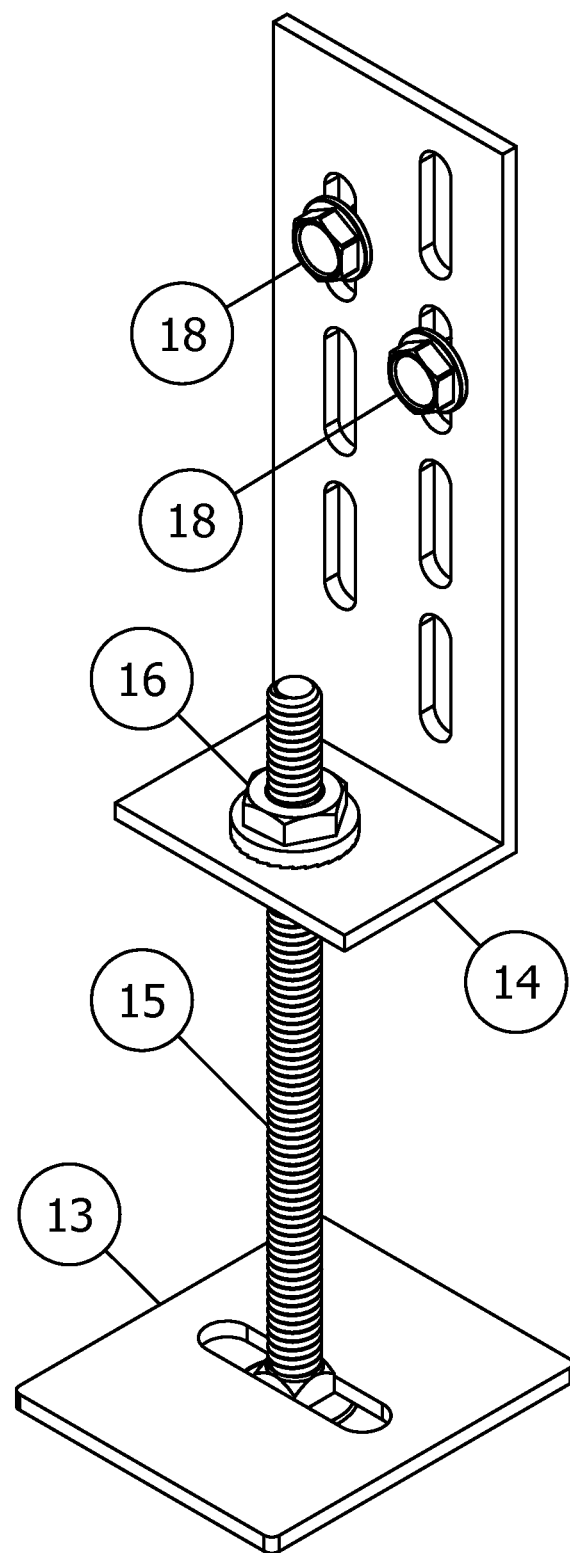
FIG. 6 is an isometric view of a currently preferred embodiment of the securing strap assembly.
Figure 7:
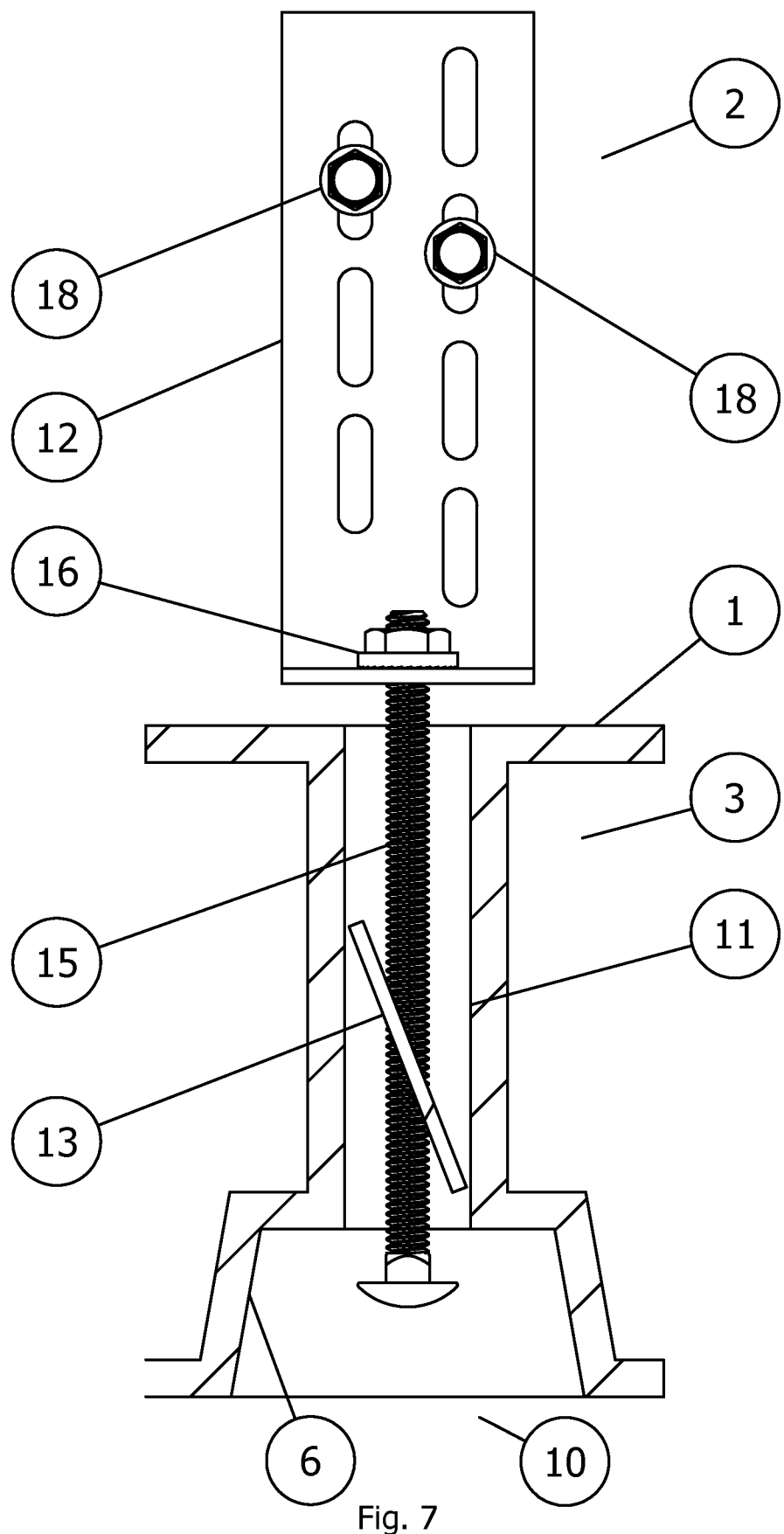
FIG. 7 is a side sectional view of the securing strap assembly as it is being inserted into a slot of the equipment pad.

FIG. 6 shows a currently preferred embodiment of one of the adjustable securing strap assemblies 12. FIG. 7 is a sectioned view detailing its installation into the pad 1. In this configuration, a carriage bolt 15 will be inserted into a slotted retaining washer 13, the slot of which will allow the retaining washer 13 to be angled with respect to the carriage bolt 15. The retaining washer 13 slot geometry also prevents the square neck of the carriage bolt 15 from rotating upon tightening. Additionally, the assembly is comprised of a securing bracket 14 and a nut 16. The retaining washer 13 of the securing strap 12 will be angled and inserted into the desired slot 11 from the top of the pad and slid inward towards the equipment 2 being secured until the bracket 14 meets the equipment 2. The retaining washer 13 will itself not rotate within the slot recess 6 once fully inserted. The single carriage bolt 15 used for cinching down the strap assembly 12 allows the securing bracket 14 to rotate allowing it to lay flat (be tangent) against the surface of the equipment 2 regardless of shape. FIG. 8 is a sectioned view detailing the final installment of the securing strap assembly 12. The securing bracket 14 will rest atop the equipment pad 1 and the nut 16 will be tightened to cinch the bracket 14 to the equipment pad 2. The securing bracket 14 will be secured to the equipment 2 using the appropriate quantity, size, and style of metal fasteners 18. Known types of anti-theft fasteners can also be used to secure the straps 12 to the equipment 2.

Figure 9:
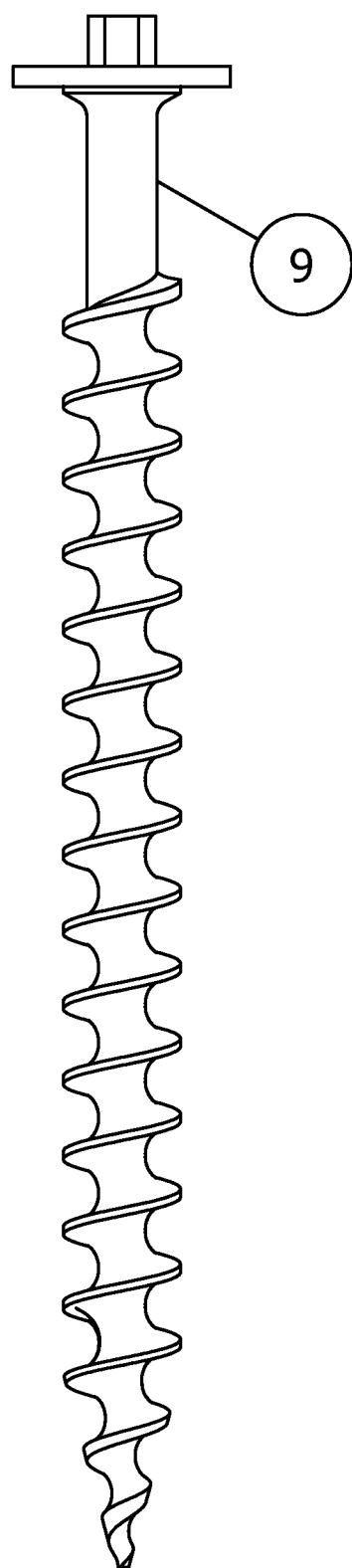
FIG. 9 is a side view of one contemplated ground anchor for the equipment pad of FIG. 1.

FIG. 9 is an embodiment of the securing anchor 9 shown in FIG. 1. This anchor is screwed into the ground to further secure the pad 1 to the underlying ground (10 in FIG. 1).

Figure 10:
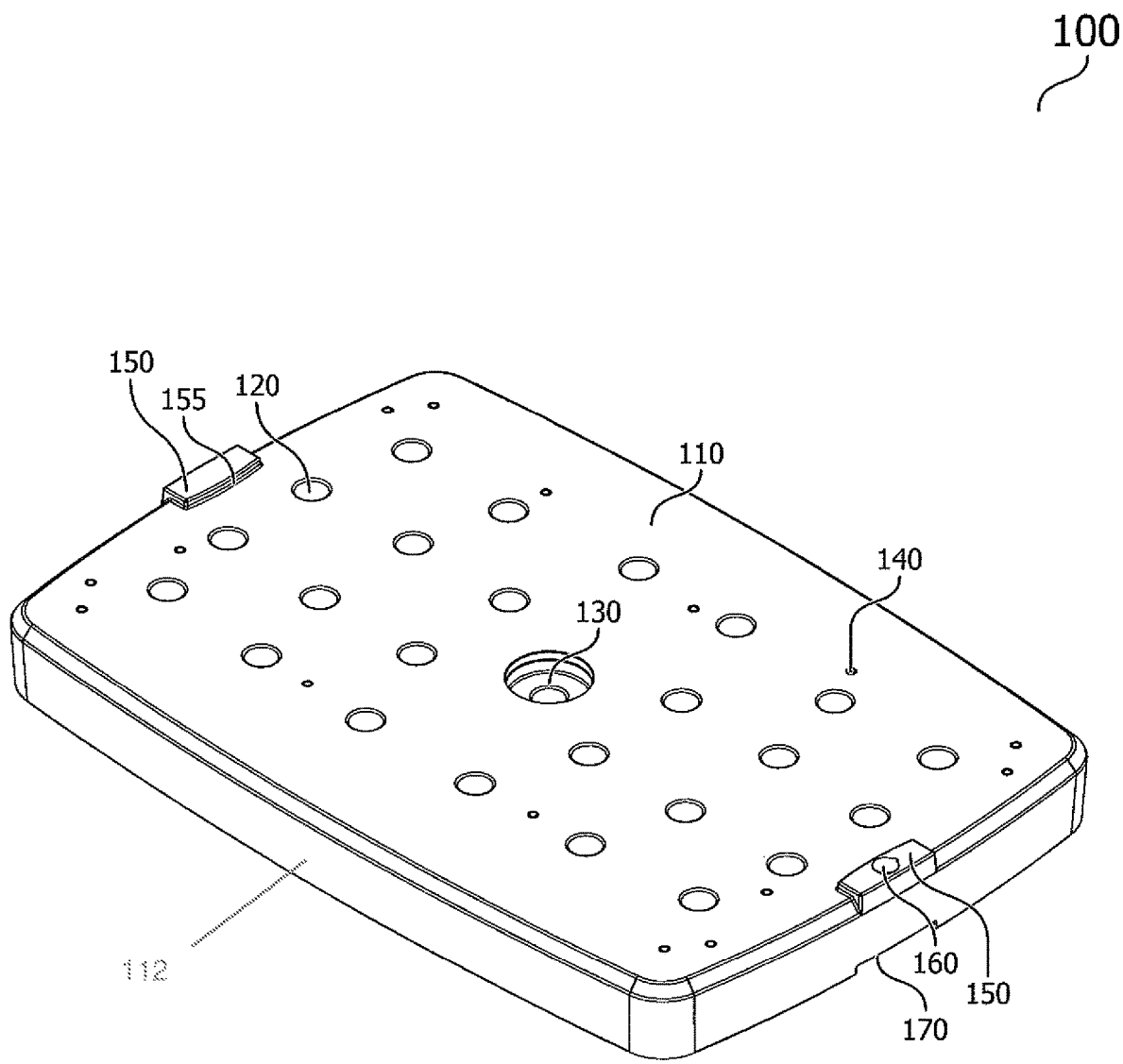
FIG. 10 is an isometric view of another embodiment of the equipment pad invention.

Referring now to FIG. 10, there is shown another embodiment of the equipment securing system 100. This embodiment includes a top surface 110. The top surface 110 has a plurality of top openings 120. The top openings 120 are chamfered so as to promote strength around each opening 120. Proximate the center of the system 100 is a center cavity 130. This center cavity 130 can be sized to accommodate any hardware or tooling that may assist in securing a piece of equipment 400 to the system 100, see e.g., FIGS. 19 and 20.

Side surfaces 112 surround the top surface 110 and connect the bottom surface 115 to the top surface to form an internal hollow region 135. On the sides of the top surface 110 and the edges of side surfaces 112 protrusions 150 are positioned. Each protrusion 150 has surfaces 155. One protrusion 150 contains fill port 160; however, the invention is not limited to having fill port 160 on solely one protrusion 150. Further, the invention is not limited to having a pair of protrusions 150 or the protrusions 150 being located proximate the centerline as shown in FIG. 10 of the equipment pad system 100. The protrusion could also be located on the corners of the top surface as depicted in FIG. 1, for example. The fill port 160 can be located on more than one protrusion 150 or on the top surface 110. The fill port 160 permits fluids to be deposited into the internal hollow region 135 between the top surface and bottom surface, see FIGS. 17 and 18. This internal hollow region 135 can also contain a super absorbent polymer material (not shown) that will combine with the water and form a gel or solidus media filling the interior hollow region 135 to prevent leakage if the seal integrity is compromised. The gel or solidus media would add additional weight to the equipment securing system 100 to prevent the attached unit, equipment, or appliance from toppling in high-winds when securing to the system 100.

Positioned on the top surface is a plurality of receivers 140. The receivers 140 are positioned on the top surface to act as points to secure a piece of equipment 400 (see FIG. 19), for example, a standby generator that is used when electric power from a utility or the like to a facility or dwelling is unavailable. Thus, for example, the standby generator can be attached, anchored, or secured to the equipment securing system 100 using attachment points, mounting holes or openings, or the like usually found in the base of the standby generator. For example, see FIG. 19, reference numeral 455.

Figure 19:
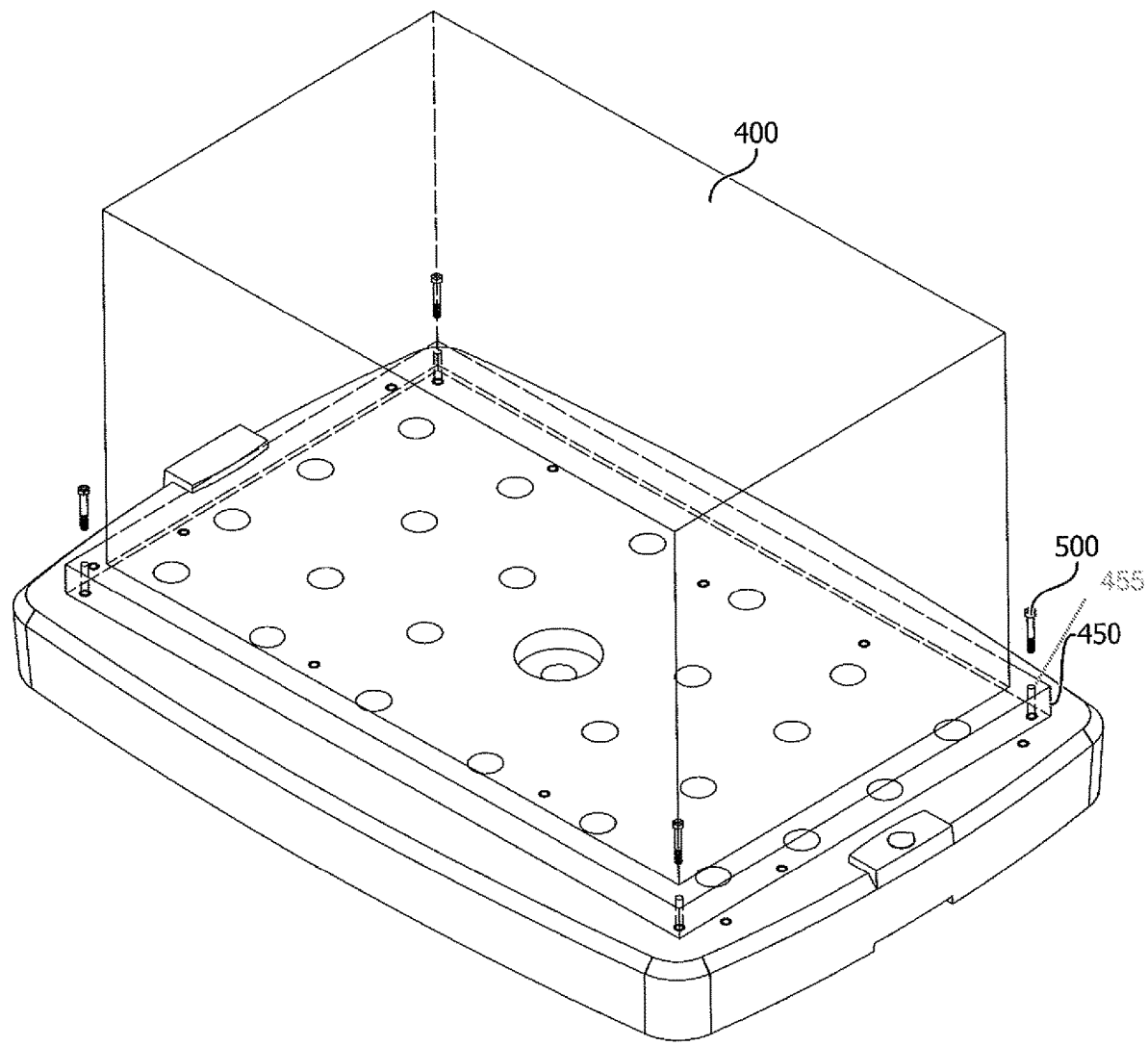
FIG. 19 is an isometric view of the equipment pad invention shown in FIG. 10, with the placement of a generalized equipment model on the equipment pad.

Receivers 140 can be grouped into patterns. Each pattern aligns with the attachment points, shown as mounting holes or openings 455, in the base 450 of a piece of equipment 400. As an example, as shown in FIG. 19, a pattern of four receivers 140 are aligned with openings 455 in the base 450 of the piece of equipment 400. The patterns that the receivers 140 can be grouped in should not be limited to patterns of four. For example, a pattern of three receivers 140 could be used to align with openings in a base 450 of the piece of equipment 400.

Figure 11:
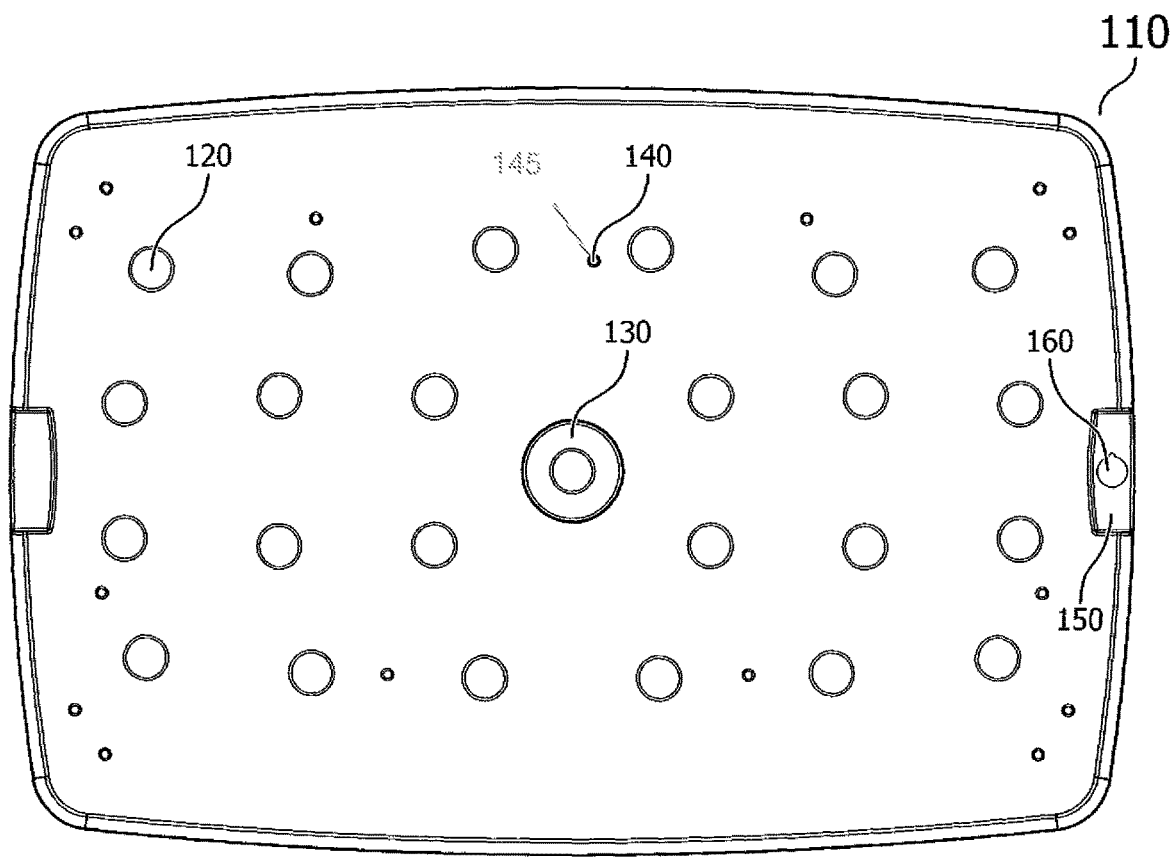
FIG. 11 is a top view of the embodiment of the equipment pad invention shown in FIG. 10.
Figure 13:
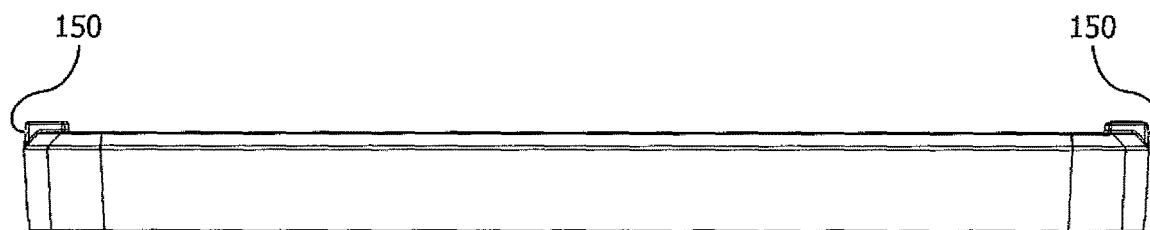
FIG. 13 is a side view of the embodiment of the equipment pad invention shown in FIG. 10.
Figure 14:
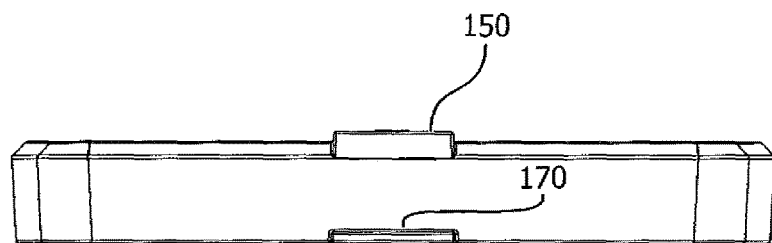
FIG. 14 is another side view of the embodiment of the equipment pad invention shown in FIG. 10.

As shown in FIG. 11, numerous patterns for the receivers 140 could be devised to align with an array openings 455 of bases 450 belong to different pieces of equipment 500. As previously stated, a pattern of three receivers 140 could be used. While FIG. 19 shows a quadrilateral pattern of receivers 140 having a rectangular aspect, other aspects encompass the invention. For example, a trapezoidal or square pattern of receivers 140 is within the scope of the invention.

Figure 12:
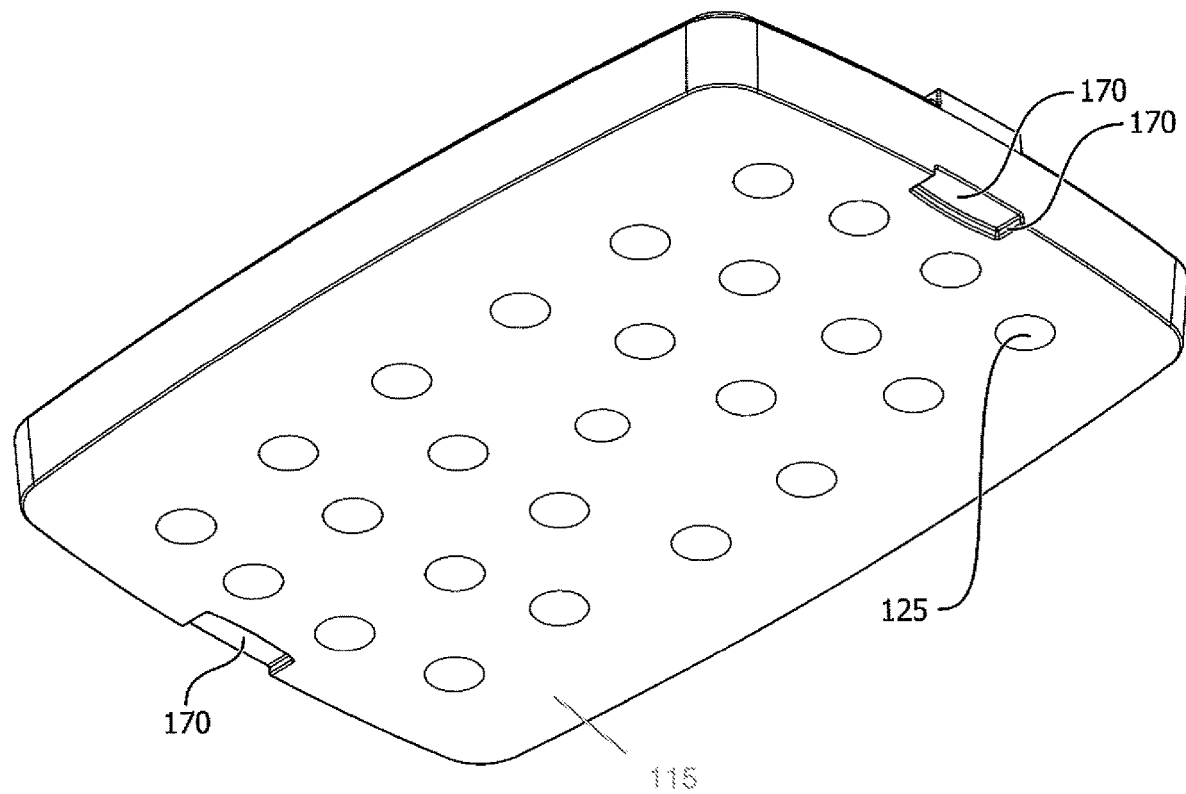
FIG. 12 is an isometric view of depicting the bottom of the embodiment of the equipment pad invention shown in FIG. 10.

FIG. 12 illustratively depicts the bottom surface 115 of the equipment securing system 110. On the edges of the bottom surface 115 are recesses 170 have walls 175. The walls 175 of the recesses 170 are sized to accommodate the surfaces 155 of the protrusions 150. Such an accommodation facilitates keeping a plurality of systems 110 in place when stacked for storage and transportation. As with the protrusions 150, the recesses 170 are not limited to a pair of recesses. Additionally, the recesses 170 are not limited to being located proximate a centerline of the bottom surface 115. The recesses 170 could also be located at the corners of the bottom surface 115 to match corresponding protrusions 150 at the top surface 110, as similarly shown in FIG. 1. Bottom openings 125 are located in bottom surface 115 and the edges of bottom openings 125 are chamfered to promote strength around each opening.

Figure 15:
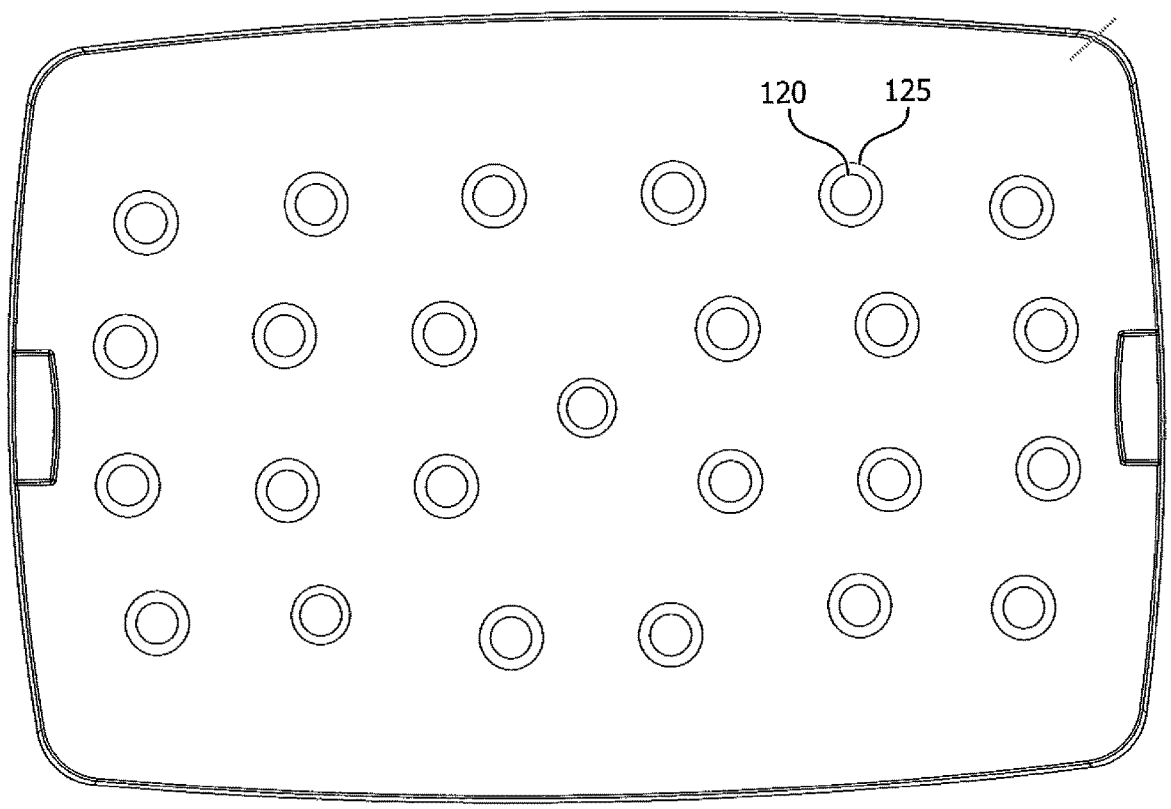
FIG. 15 is a bottom view of the embodiment of the equipment pad invention shown in FIG. 10.

As best shown in FIG. 15, there is a relationship between the top openings 120 and the bottom openings 125. The bottom openings are larger in relation to the top openings 120. However, this relationship should not being considered as limiting the invention to the bottom openings 125 being larger than the top openings 120. Other relationships, such as both openings being equal size, are contemplated and fall within the scope of the invention.

Figure 16:
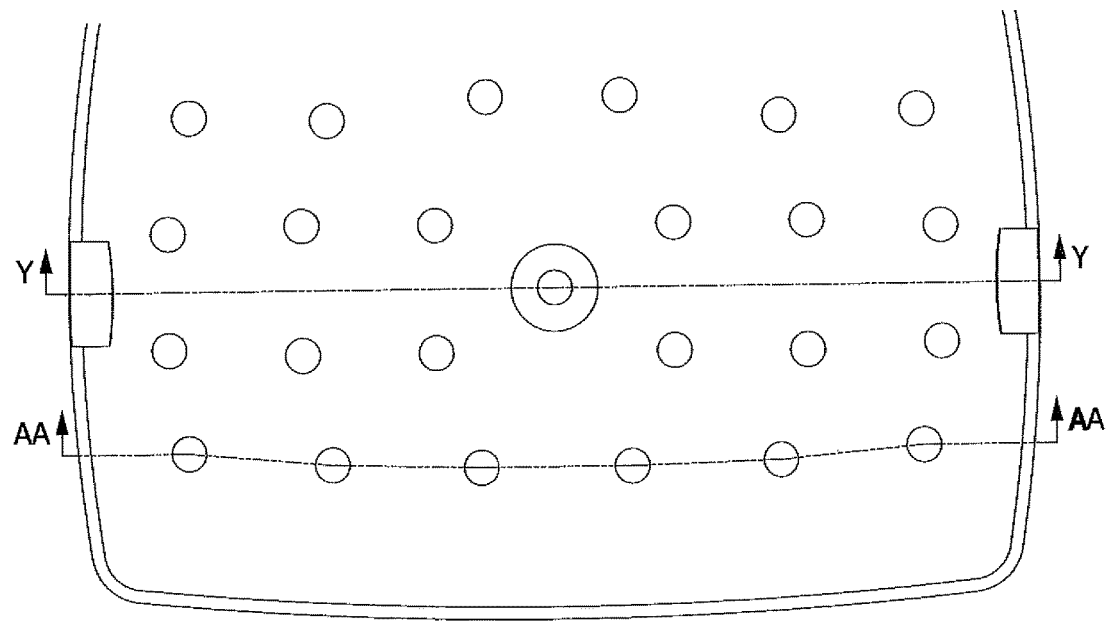
FIG. 16 is a cut plane view of the embodiment of the equipment pad invention shown in FIG. 10.
Figure 17:
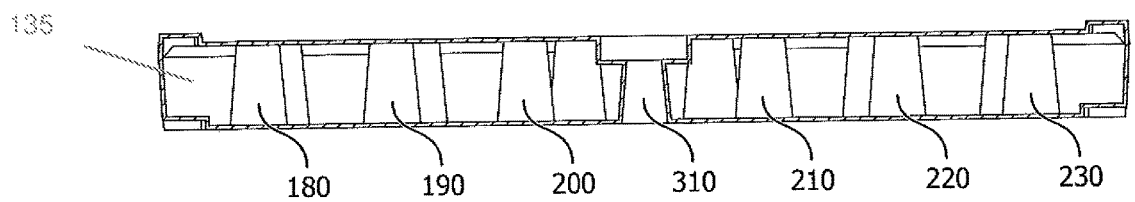
FIG. 17 is a cross-sectional view along the cross-section line Y-Y of the embodiment of the equipment pad invention shown in FIG. 10.
Figure 18:
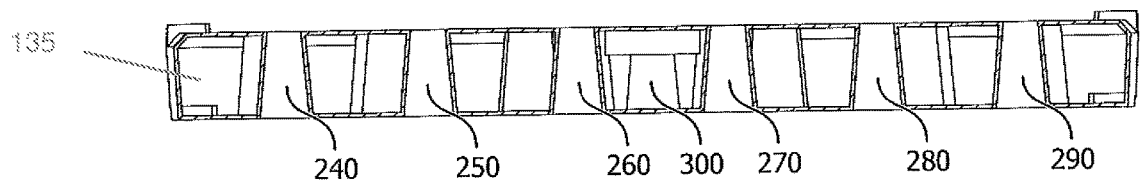
FIG. 18 is a cross-sectional view along the cross-section line AA-AA of the embodiment of the equipment pad invention shown in FIG. 10.

As shown in FIG. 16, sectional view Y-Y bisects the equipment securing system 100. FIG. 17 shows the cross-sectional view of sectional Y-Y. As shown in FIG. 17, the top surface 110 and bottom surface 115 are connected by a plurality of supporting structures that are illustratively reference by reference numerals 180, 190, 200, 210, 220, 230. These supporting structures prevent deflection of the top surface 110 due to the weight of equipment 400 that would set on the equipment securing system 100. Due to the differing diameters of top openings 120 and bottom openings 125 each of the supporting structures 180, 190, 200, 210, 220, 230 has the shape of a frustum of a cone having a corresponding volume 240, 250, 260, 270, 280 as illustrated in FIG. 18 that depicts the cross-sectional view of the equipment securing system taken along cross-sectional AA-AA. Center post 300 is shaped similar to supporting structures 180, 190, 200, 210, 220, 230, except for the center cavity 130 being sized to accommodate tools, hardware, or fasteners being stored in the cavity prior to a piece of equipment 400 being installed on equipment securing system 100. Center volume 310 corresponds to volumes 240, 250, 260, 270, 280 to the point where the base of center cavity 130 begins, then the volume expands to accommodate the tools, hardware, or fasteners being stored in the cavity 130 prior to installation of a piece of equipment 400 being installed on the equipment securing system 100. Of course, the invention contemplates other geometrical shapes for the supporting structures and corresponding volumes that would be dependent on the different shapes for the top and bottom openings.

FIG. 19 shows an exemplary piece of equipment 400 set on equipment securing system 100. The base 450 of the equipment 400 has opening 455 for fastener devices 500 to pass through and engage the receivers 140. Fastener devices 500 can be any type that are known to those in the art, e.g., threaded fasteners (bolts, screws, studs), friction-fit fasteners, rivet-type fasteners, nails, pins, and dowels. The receivers 140 are formed to compliment the many types of fastener devices known in the art, for example, the receivers could have internal threads (further described below) that mate with external thread fasteners. Receivers 140 could be provided with inserts 145. The inner surface of the inserts 145 could have appropriately mating internal threads for fastener devices 500. For example, the internal threads could be bolt, screw, or stud threads. Additionally, receivers 140 could be formed to accept "thread-forming," self-tapping, or thread-cutting fasteners, such as for example, thread forming screws or sheet metal screws. Likewise, the inserts 145 could be formed to accept "thread-forming," self-tapping, or thread-cutting fasteners. In addition, both receivers 140 and inserts 145, individually or in combination, could be formed to accept non-threaded fasteners, such as keys, pins, retaining rings, snap rings, rivets, or the like. Alternatively, both receivers 140 and inserts 145, individually or in combination, could be formed as an anchoring system incorporated into the equipment securing system 100 by known techniques. For example, the receivers 140 and/or inserts 145 could be part of a grouted anchor, a flexible anchor, a boxed anchor, expansion shield anchor, expanding anchor, expanding pug anchor, adhesive anchor, and nails.

Figure 20:
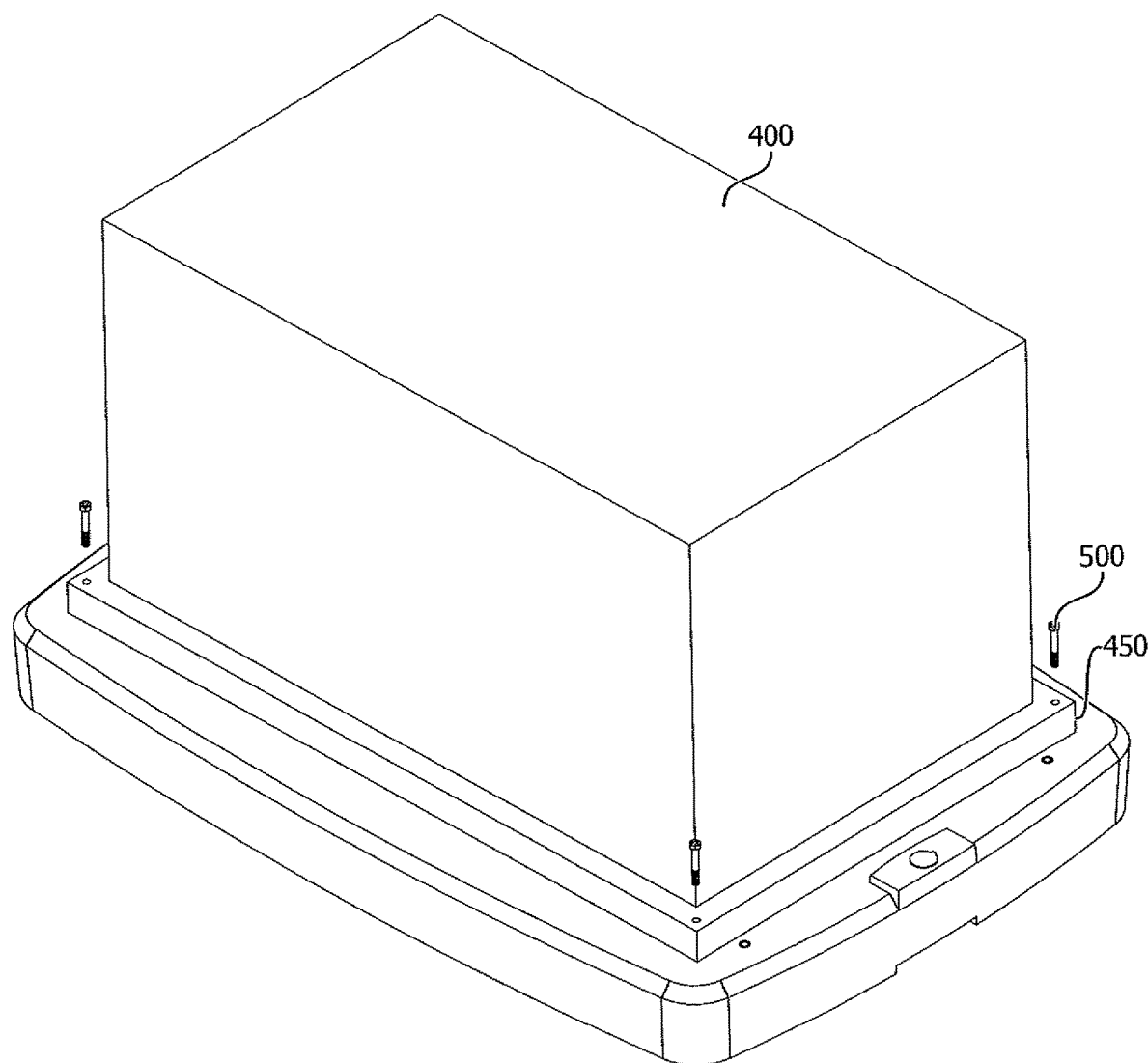
FIG. 20 is an isometric view of the equipment pad invention shown in FIG. 10, with a generalized equipment model secured on to the equipment pad.

FIG. 20 shows an exemplary piece of equipment secured to the equipment securing system 100 using fastener device 500.

While we have shown and described our invention above, it should be understood that the same is susceptible to changes and modifications that will now be apparent to one skilled in the art. Therefore, we do not intend to be limited to the details shown and described herein but contemplate that all such changes and modifications will be covered to the extent encompassed by the appended claims.

We claim:

1. A pad for securing an equipment via fasteners comprising:
a top surface, a bottom surface, and a side surface attached to the top surface and the bottom surface, the side surface defining a distance between the top surface and the bottom surface; and
said top surface having positioned thereon a set of receivers for receiving a plurality of inserts, wherein the set of receivers with inserts consists of two receivers with inserts disposed in a linear patterned associated with a first distinct equipment, three receivers with inserts disposed in a triangular pattern associated with a second distinct equipment, first four receivers with inserts disposed in a trapezoid pattern associated with a third distinct equipment, and second four receivers with inserts disposed in a quadrilateral pattern associated with a fourth distinct equipment.

2. A pad for securing an equipment via fasteners comprising:
a top surface, a bottom surface, and a side surface attached to the top surface and the bottom surface, the side surface defining a distance between the top surface and the bottom surface; and said top surface having positioned thereon a set of receivers for receiving a plurality of inserts, wherein the set of receivers with inserts consists of two receivers with inserts disposed in a linear patterned associated with a first distinct equipment, four receivers with inserts disposed in a trapezoid pattern associated with a second distinct equipment, first four receivers with inserts disposed in a second trapezoid pattern associated with a third distinct equipment, and second four receivers with inserts disposed in a quadrilateral pattern associated with a fourth distinct equipment.

3. The pad of claim 1, the set of receivers with inserts further consists of third four receivers with inserts disposed in a quadrilateral pattern associated with a fifth distinct equipment.

4. The pad of claim 2, the set of receivers with inserts further consists of third four receivers with inserts disposed in a quadrilateral pattern associated with a fifth distinct equipment.

5. The pad of claim 1, 2, 3, or 4, wherein the inserts each have an inner surface to engage the fasteners to secure the equipment to the pad.

6. The pad of claim 5, wherein the inner surface is a threaded surface.

7. The pad of claim 5, wherein the inner surface accepts the fasteners selected from the group consisting of thread forming, self tapping, and thread-cutting fasteners.

8. The pad of claim 5, wherein the inner surface accepts the fasteners selected from the group consisting of keys, pins, retaining rings, snap rings, and rivets.

9. A pad for securing an equipment via fasteners comprising:
a top surface, a bottom surface, and a side surface attached to the top surface and the bottom surface, the side surface defining a distance between the top surface and the bottom surface;
said top surface having a plurality of receivers for receiving inserts to engage the fasteners to secure the equipment to the pad, each receiver having a receiver lower surface at a depth less than the distance between the top surface and the bottom surface and each insert having an insert lower surface at a depth less than the distance between the top surface and the bottom surface, wherein the plurality of receivers and inserts consists of two receivers and inserts in a linear pattern, three receivers and inserts in a triangular pattern, first four receivers and inserts in a trapezoid pattern, and second four receivers and inserts in a quadrilateral pattern.

10. A pad for securing an equipment via fasteners comprising:
a top surface, a bottom surface, and a side surface attached to the top surface and the bottom surface, the side surface defining a distance between the top surface and the bottom surface;
said top surface having a plurality of receivers for receiving inserts to engage the fasteners to secure the equipment to the pad, each receiver having a receiver lower surface at a depth less than the distance between the top surface and the bottom surface and each insert having an insert lower surface at a depth less than the distance between the top surface and the bottom surface, wherein the plurality of receivers and inserts consists of two receivers and inserts in a linear pattern, first four receivers and inserts in a trapezoid pattern, second four receivers and inserts in a second trapezoid pattern, and third four receivers and inserts in a quadrilateral pattern.

11. The pad of claim 9, the set of receivers with inserts further consists of third four receivers with inserts disposed in a quadrilateral pattern.

12. The pad of claim 10, the set of receivers with inserts further consists of fourth four receivers with inserts disposed in a quadrilateral pattern.

13. The pad of claim 9, 10, 11, or 12, wherein the plurality of inserts each further have an inner surface to engage the fastener to secure the equipment to the pad.

14. The pad of claim 13, wherein the inner surface is a threaded surface.

15. The pad of claim 13, wherein the inner surface accepts the fasteners selected from the group consisting of thread forming, self tapping, and thread-cutting fasteners.

16. The pad of claim 13, wherein the inner surface accepts the fasteners selected from the group consisting of keys, pins, retaining rings, snap rings, and rivets.

* * * * *